(12) United States Patent
Lin et al.

(10) Patent No.: US 8,370,052 B2
(45) Date of Patent: Feb. 5, 2013

(54) ENGINE COOLING SYSTEM ONBOARD DIAGNOSTIC STRATEGY

(75) Inventors: George Lin, Dunlap, IL (US); Gurpreet Gambhir, Peoria, IL (US); Zenebe Gete, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 761 days.

(21) Appl. No.: 12/582,814

(22) Filed: Oct. 21, 2009

(65) Prior Publication Data

US 2010/0095909 A1     Apr. 22, 2010

Related U.S. Application Data

(60) Provisional application No. 61/196,944, filed on Oct. 22, 2008.

(51) Int. Cl.
    *G06F 19/00*          (2006.01)
    *G06F 17/40*          (2006.01)
    *F01P 5/14*           (2006.01)
    *G01M 15/00*         (2006.01)
    *G01C 17/38*         (2006.01)

(52) U.S. Cl. .................. 701/114; 123/41.08; 123/41.15; 73/114.68; 702/99; 702/116; 702/187

(58) Field of Classification Search ...... 123/41.08–41.1, 123/41.15, 198 D; 701/101–103, 107, 114, 701/115; 73/114.61, 114.68; 702/99, 116, 702/130, 182, 183, 185, 187
See application file for complete search history.

(56) References Cited

U.S. PATENT DOCUMENTS

| | | | | |
|---|---|---|---|---|
| 5,153,835 | A * | 10/1992 | Hashimoto et al. | 701/114 |
| 6,302,065 | B1 * | 10/2001 | Davison | 123/41.15 |
| 6,321,695 | B1 * | 11/2001 | Yoo et al. | 123/41.15 |
| 6,505,466 | B1 * | 1/2003 | Nagafusa et al. | 123/41.15 |
| 6,907,343 | B2 * | 6/2005 | Tsukamoto et al. | 701/114 |
| 7,111,506 | B2 * | 9/2006 | Tsukamoto et al. | 73/114.68 |
| 7,226,491 | B2 * | 6/2007 | Choi | 73/114.68 |
| 8,046,150 | B2 * | 10/2011 | Anilovich et al. | 701/102 |
| 8,224,517 | B2 * | 7/2012 | Eser et al. | 701/31.4 |
| 2011/0120216 | A1 * | 5/2011 | Sugimoto | 73/114.68 |
| 2012/0137992 | A1 * | 6/2012 | Kinomuka et al. | 123/41.08 |

* cited by examiner

*Primary Examiner* — Willis R Wolfe, Jr.
(74) *Attorney, Agent, or Firm* — Liell & McNeil

(57) ABSTRACT

An onboard cooling system diagnostic strategy utilizes at least one temperature sensor fluidly positioned between an electronically controlled engine and a thermostat. The diagnostic algorithm operates by monitoring coolant temperature during engine startup. By comparing the actual coolant temperature during engine start-up to a predicted coolant temperature that should occur if no cooling system error is present, a cooling system fault condition may be identified. If a cooling system fault is detected, the diagnostic logic may activate the engine cooling fan or intrusively open an electrically controlled thermostat while monitoring the coolant temperature response to the intrusive action. If there is a substantial change in coolant temperature responsive to the intrusive action, this phenomenon can be utilized to correctly distinguish between a thermostat failure and a vehicle configuration error corresponding to an overcooled vehicle. The present disclosure also can utilize a similar strategy to diagnose problems associated with other vehicle fluid coolers that exchange heat with ambient air moved by a circulation fan.

20 Claims, 6 Drawing Sheets

ENGINE COOLING SYSTEM ONBOARD DIAGNOSTIC STRATEGY

RELATION TO OTHER PATENT APPLICATION

This application claims priority to provisional patent application 61/196,944, filed Oct. 22, 2008 with the same title, which is incorporated by reference herein.

TECHNICAL FIELD

The present disclosure relates generally to onboard diagnostic systems for machines, and more particularly to an engine cooling system onboard diagnostic strategy that distinguishes between thermostat failures and vehicle configuration errors.

BACKGROUND

Emissions from an internal combustion engine can be significantly affected by the operating temperature of the engine. If a faulty thermostat is stuck in an open position, excess undesirable emissions can result due to an extended warm up period for the engine. Alternatively, if too many heat exchangers that exchange heat with engine coolant are added to a final machine, the engine might also warm up slowly. In extreme situations the engine may not be able to warm up completely to normal operating temperatures. An overcooled vehicle configuration may be misdiagnosed as a thermostat failure.

The present disclosure is directed to one or more of the problems set forth above.

SUMMARY OF THE DISCLOSURE

In one aspect, an engine cooling system diagnostic method includes initiating execution of a cooling system diagnostic algorithm. A coolant temperature for at least one location at a plurality of times is recorded as part of execution of the cooling system diagnostic algorithm. A cooling system electrical actuator is intrusively actuated as part of the execution of the cooling system diagnostic algorithm when a cooling system controller has the cooling system electrical actuator deactuated. A coolant temperature before the actuating step is compared with a coolant temperature after the actuating step as part of the execution of the cooling system diagnostic algorithm. Finally, a cooling system fault is logged if a comparison from the comparing step satisfies a condition as part of the execution of the cooling system diagnostic algorithm.

In another aspect, an engine system includes an electronically controlled engine with an electronic controller. The cooling system is fluidly connected to the electronically controlled engine, and includes a thermostat, and a temperature sensor positioned for sensing a coolant fluid temperature at a position between the thermostat and the electronically controlled engine. The temperature sensor is in communication with the electronic controller. The electronic controller being configured to execute a cooling system diagnostic algorithm operable to log one of a cooling configuration fault or a thermostat fault.

In another aspect, an engine system is attached to a machine body and includes an electronically controlled engine with an electronic controller. The engine system also includes a cooling system fluidly connected to the electronically controlled engine, and a thermostat. A temperature sensor is positioned for sensing a coolant fluid temperature between the thermostat and the electronically controlled engine. The temperature sensor is in communication with the electronic controller. The electronic controller is configured to execute a cooling system diagnostic algorithm operable to log one of a machine cooling configuration fault or a thermostat fault. At least one machine heat exchanger is attached to the machine body and fluidly connected to the cooling system.

DETAILED DESCRIPTION

Figure 1:
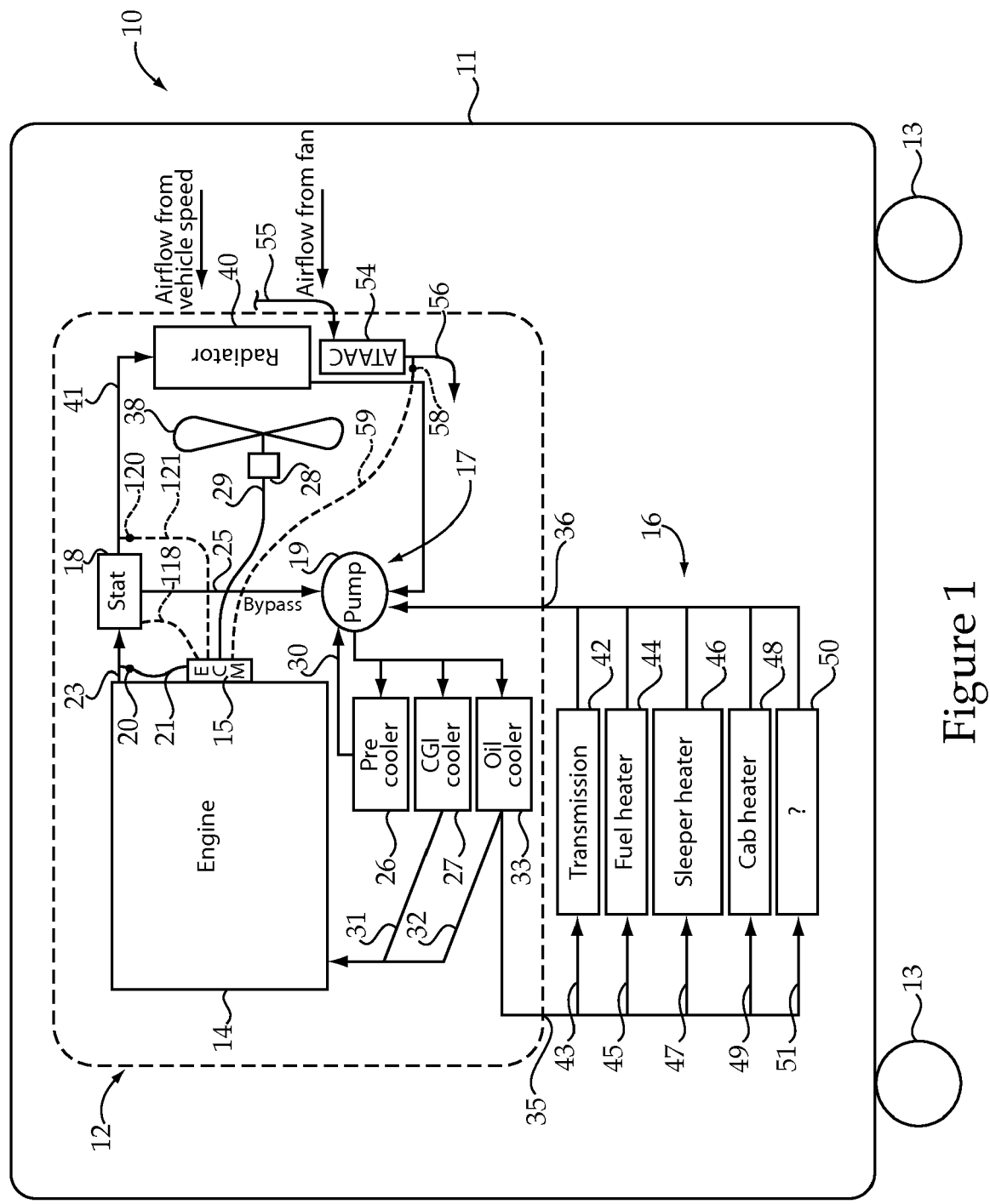
FIG. 1 is a schematic illustration of a machine according to one aspect of the present disclosure.

Some motorized machines include an onboard diagnostic system for identifying an engine cooling system failure. In one specific example, automobile manufacturers may use a "predictive" approach that employs a temperature sensor fluidly positioned between the engine and the thermostat, and in communication with the electronic engine controller. By comparing an actual engine start temperature curve to a predicted curve, the onboard diagnostic algorithm can determine whether a thermostat failure has occurred. The failure may be logged by the engine controller, and may be communicated to the operator via some suitable means, such as a dashboard service engine soon light. This type of onboard diagnostic strategy works well in applications where the manufacturer has accurate and predictable data with regard to heat and cooling demands placed on the engine cooling system. Since most automobile manufacturers make, assemble and are familiar with the various hardware components of their machines, they can accurately predict the coolant temperature curve at engine start.

In some applications, the machine manufacturer purchases engine systems made by another manufacturer. A purchased engine system may typically include an electronically controlled engine and several features of a cooling system, including a thermostat and pump. In many of these situations, the previously described "predictive" coolant system diagnostic approach may not prove satisfactory because the engine system manufacturer may not be able to predict the variable heat demand loads placed on the final machine by the machine manufacturer and/or end customer installed systems. For instance, the same engine system in one application may include a transmission cooler, a fuel heater, a sleeper heater and maybe even a cabin heater; but, another application for the same engine system may not include any of the previously described heaters. Because some of the coolant connections can behave as both a heat sink and a heat source, the engine system manufacturer may be placed in a difficult position predicting what a typical engine start temperature warm up curve should look like, rendering the so-called "predictive" approach to onboard diagnostics problematic. In still other instances, an end-user may add still another heat exchanger, such as a water heater if the end machine is being used as in a carpet cleaning business. The heat exchange demands added to the engine system may be so severe that the engine is actually over cooled, and may never be able to warm up to regular operating temperatures as per the engine system manufacturer's specifications. This can give rise to still another problem with misdiagnosing extreme machine cooling design configurations as a thermostat failure. For example, the engine system manufacturer may be plagued with warranty claims regarding supposedly faulty thermostats in applications where the thermostat is working properly but the added heat exchange connections made to the engine cooling system render the engine overcooled, which may be characterized as being caused by vehicle configuration.

Referring to FIG. 1, a machine 10 includes a machine body 11 that may be made mobile by being supported on some suitable ground supporting member(s), such as wheels 13 as shown, tracks or some other equivalent. Machine 10 could also possibly be an airplane, a boat or some other motorized machine, or even a stationary machine, such as a generator system. Machine 10 may include an engine system 12 carried by machine body 11. Engine system 12 includes an electronically controlled engine 14 and a portion of a cooling system 17. Electronically controlled engine 14 includes a conventional electronic engine controller 15 that controls the various electrical actuators (e.g. fuel injectors) that control the operation of the engine. Cooling system 17 includes a thermostat 18, a coolant pump 19 and several heat exchangers, including but not limited to a precooler 26, an exhaust gas recirculation (EGR) cooler (CGI) 27 and an oil cooler 33. As in a typical engine system, pump 19 is driven to circulate coolant fluid to and from engine 14 via various known passages including a coolant return passage 23, and a coolant bypass passage 25. The pump output may be divided among a pre-cooler loop 30, an EGR loop 31 and an oil cooler loop 32. A temperature sensor 20 may be positioned for sensing coolant temperature at a location between engine 14 and thermostat 18. This sensor information may be communicated to the electronic engine controller 15 via a communication line 21. If so equipped, machine 10 may also include additional coolers. For instance, an air to air aftercooler 54 receives compressed air from a compressor of a turbocharger (not shown) via a compressed air passage 55. The compressed air may be cooled to transfer heat to ambient air circulated through the air to air aftercooler 54 and then supply the cooled compressed air to an engine intake manifold (not shown) via a cooled air passage 56. In the event that the thermostat 18 is electronically controlled, the thermostat 18 might receive opening and closing commands via a communication line 118, which is shown as a dashed line indicating that the present disclosure contemplates strategies that include electronically controlled thermostats or conventional passive thermostats that are well known in the art.

Machine 10 may also include an engine fan 38 that is driven to rotate by an electronically controlled motor 28 in communication with electronic engine controller 15 via communication line 29. A radiator 40 may be suitably positioned on machine body 11 for circulating coolant fluid via radiator loop 41 when thermostat 18 opens. As in typical start operation, the thermostat 18 should remain closed such that pump 19 circulates coolant fluid through the various loops 30, 31, 32, through engine 14 and back to pump 19 via coolant return passage 23 and coolant bypass passage 25. As engine 14 warms up and reaches a predetermined thermostat opening temperature, thermostat 18 should open, either passively or via engine controller command, to allow coolant fluid to begin circulating through the radiator loop 41 to be further cooled at radiator 40. Additional cooling capabilities are achieved by commanding rotation of engine fan 38 to draw or push air through radiator 40 and circulate air over the outer surface of engine 14. Engine fan 38 may also circulate air through air to air aftercooler 54 and possibly other coolers including a pre-cooler cooler 26, CGI cooler 27, oil cooler 33, and any other coolers that may be included, but not shown, on machine 10. Those skilled in the art will appreciate that the operation of fan 38 may effect the cooling effectiveness of these various coolers or any other cooler of machine 10 that exchange heat with ambient air.

A typical faulty thermostat is one that either is stuck open or stuck in a closed position. If stuck in a closed position, that may reveal itself by the engine becoming overheated due to the inability of the coolant fluid to exchange heat with the atmosphere via radiator 40. On the other hand, if the thermostat is stuck open, the engine could take a prolonged period to warm up due to coolant being circulated through radiator 40 even when the coolant temperature is low. This disclosure is primarily concerned with the latter type of thermostat failure in which the thermostat is stuck in an open position allowing the circulation of cooling fluid to radiator 40 during engine start and thereafter.

Machine 10 may also be configured with additional machine heat exchangers 16 that utilize engine cooling fluid to perform their specific tasks. For instance, machine 10 may be equipped with a transmission heat exchanger 42 connected to oil cooler loop 32 via a transmission loop 43. In addition, machine 10 may include a fuel heater 44 fluidly connected in a fuel heater loop 45, a sleeper heater 46 connected on a sleeper heater loop 47 and a cabin heater 48 on a heater loop 49. Finally, an unknown heat exchanger 50 is shown connected in at loop 51 to illustrate still another unknown heat exchanger that either the machine manufacturer or end-user may add to engine system 12. Thus in many instances, the manufacturer of engine system 12 may have little ability to control or predict what additional heat exchangers may be fluidly connected to cooling system 17. On the other hand, the machine manufacturer and/or end user may not be sufficiently knowledgeable with regard to what heat exchanger loads can be added to system 17 without resulting in engine 14 being put into an over cooled situation corresponding to a vehicle cooling configuration error. Thus, the engine manufacturer may provide engine system 12 with a coolant out bound port 35 and a coolant return port 36 so that the end user or machine manufacturer may fluidly connect any number of machine heat exchangers 16 as illustrated in FIG. 1.

In accordance with one aspect of the present disclosure, electronic engine controller 15 may be configured to execute a cooling system diagnostic algorithm that utilizes only a single temperature sensor 20 to not only diagnose a cooling system fault condition, but also correctly distinguish between a vehicle configuration error and a thermostat failure. In this aspect, the vehicle cooling system diagnostic algorithm will only be executed during engine startup, as that time is amenable to revealing cooling system fault conditions. The algorithm may operate by first predicting what the coolant temperature curve profile should look like, and comparing it to the actual temperature readings from temperature sensor 20 during an actual start up procedure. If the actual temperature deviates from the expected or predicted coolant temperature by some magnitude greater than a predetermined threshold, the cooling system diagnostic initially logs a cooling system fault condition. The predetermined threshold may be stored before engine operation or calculated during engine operation, or otherwise. The predetermined threshold may be determined by testing a plurality of engine and cooling configurations and taking into account variations on temperature readings in different ambient conditions and other influences. In other words, setting the predetermined threshold outside of a range of normal operation temperatures, thermostat opening temperatures, cooling configurations and the like so that erroneous fault determinations are rendered less likely. When a fault occurs, the cooling system diagnostic algorithm will set itself to also monitor a subsequent engine startup, but do so with the engine fan turned on, when it would normally be turned off during an engine start procedure. If during the second and subsequent engine start procedure the temperature differs not only from the predicted temperature but also from the previous recorded fault condition temperature, this event is logged as a thermostat failure. The reason for this is that the temperature warm up curve should differ substantially when the thermostat is stuck open (1st pass) versus a warm-up procedure when the thermostat is stuck open and the engine fan is turned on (2nd pass) when it would normally be off. On the other hand, if the second set startup comparison reveals a temperature that is about the same as the first noted temperature fault condition, this is logged as a vehicle configuration error, suggesting an overcooled engine condition with a properly operating thermostat that remained closed during both the first and second engine starts. Note that in many cases, vehicle configuration errors may not be distinguishable from engine fan failures, but are distinguishable from thermostat errors.

Figure 3:
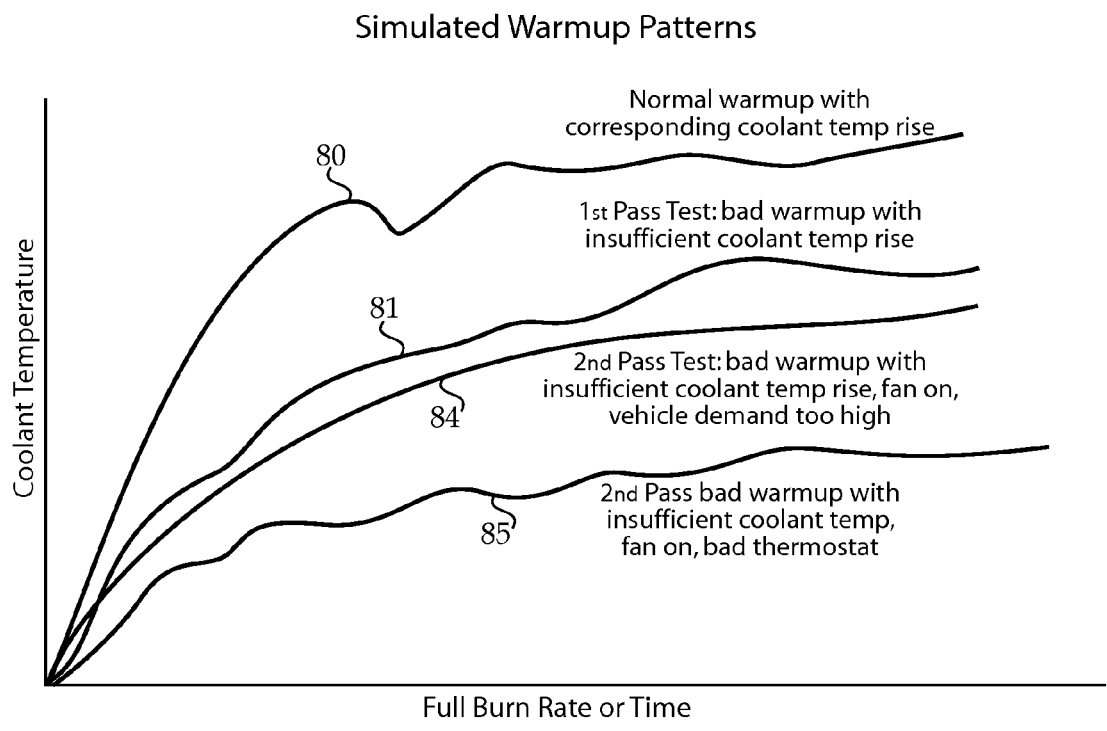
FIG. 3 is a graph of coolant temperature versus fuel burn rate or time elapsed for a normal warm-up, a thermostat fault warm-up and a vehicle configuration fault warm-up.

FIG. 3 shows examples of one proper predicted engine coolant startup temperature profile 80 and a first pass fault condition coolant temperature profile 81 that deviates substantially from the predicted temperature profile. As expected, the first pass bad warm up temperature profile 81 shows the engine warming up at a slower rate due either to a thermostat that is stuck open or because the heat exchange demands on the engine cooling system renders it overcooled. The second pass test reveals which of these two phenomena has caused the bad warm up profile. The second pass temperature profile 84 is indicative of a vehicle configuration error, but a second pass temperature profile 85 is indicative of a thermostat failure. Those skilled in the art will appreciate that the second pass temperature profile will be one or the other of profiles 84 and 85, but almost certainly cannot be both. Thus, the graph in FIG. 3 is for illustrative purposes only in order to graphically compare different performance profiles indicative of both a proper warm up profile 80 compared to first and second pass of temperature warm up profiles 81, 84 and 85.

Figure 4:
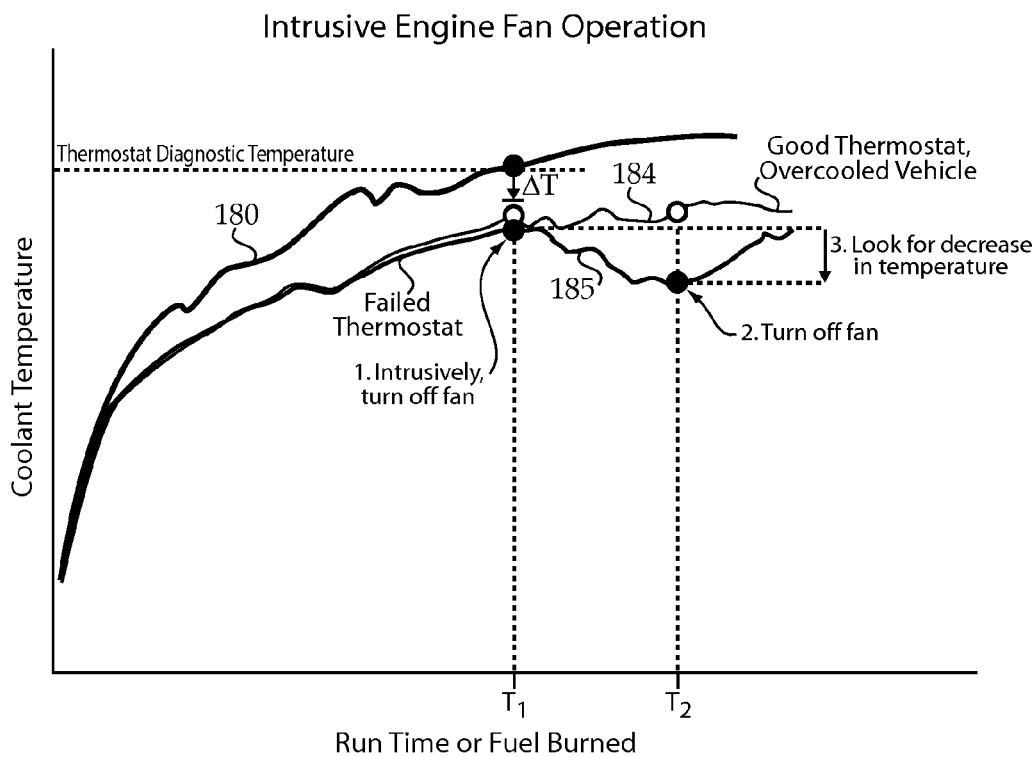
FIG. 4 is a graph of coolant temperature versus fuel burn rate or time elapsed for a normal warm-up, a thermostat fault warm-up, and a vehicle configuration fault warm-up, utilizing an alternative strategy from that associated with FIGS. 2 and 3.

Referring now to FIG. 4, an alternative single warm-up procedure strategy is illustrated in contrast to the two pass warm-up strategy discussed in relation to FIG. 3. In particular, through testing various engine configurations that are not overcooled in various ambient conditions and taking into account other variables, a thermostat diagnostic temperature (TDT) might be determined in relation to run time or fuel burned to occur, on average, at time $T_1$. In other words, on average, an engine that includes a properly working thermostat and is not otherwise overcooled should be within a temperature variance $\Delta T$ of the thermostat diagnostic temperature (TDT) after a run time or fuel burned associated with $T_1$ on the graph. Thus, curve 180 indicates a predicted warm-up curve for machine 10. At time $T_1$, if the temperature of the coolant measured by temperature sensor 20 and communicated to engine controller 15 via communication line 21 indicated that the coolant temperature is substantially lower than the thermostat diagnostic temperature then a fault condition may be indicated. However, not yet enough information is available to correctly distinguish between a failed thermostat and a vehicle configuration error relating to an overcooled vehicle. Thus, if the measured temperature deviates substantially more from the thermostat diagnostic temperature in a magnitude greater than the variance $\Delta T$, the engine controller 15 will then intrusively turn the fan 38 on at the time $T_1$ when it would normally otherwise be off. Those skilled in the art will appreciate that the thermostat diagnostic temperature is set to be substantially lower than the temperature at which the thermostat ought to open toward the end of an engine start up procedure. Thus, at time $T_1$ the thermostat should be closed. With the fan 38 intrusively turned on by engine controller 15, the coolant temperature is again measured at some predetermined time later $T_2$. Curve 184 shows that even with the fan turned on, the coolant temperature remains relatively steady indicating that the thermostat is functioning properly, but there is a vehicle configuration error corresponding to an overcooled vehicle. This is because the thermostat must still be closed, and the turning on of fan 38 should not be expected to change the coolant temperature since coolant is not yet being circulated through radiator 40, but the coolant temperature is nevertheless not increasing substantially as would be expected in an overcooled vehicle. Those skilled in the art will appreciate that curve 184 could indicate a slight increase, virtually no change in temperature from time $T_1$ or maybe even a slight decrease with all being correctly diagnosed as an overcooled vehicle condition. On the otherhand, curve 185 shows circumstances that one could expect if fan 38 is turned on at time $T_1$, and then the coolant temperature measured at a later time $T_2$ indicating a substantially lower coolant temperature. Thus, curve 185 indicates a failed thermostat. This might be expected by the fact that it indicates that the thermostat must have been stuck open, and turning on fan 38 would, as expected, cause radiator 40 to be more effective in removing heat from the engine coolant. This being revealed by a drop in coolant temperature at time $T_2$ with the fan 38 on. The magnitude of the drop in temperature from time $T_1$ to time $T_2$ can be calibrated to ensure that a failed thermostat can be accurately distinguished from the cooling curve 184 associated with an overcooled vehicle. Thus, the graph of FIG. 4 illustrates an alternative method of diagnosing either an overcooled vehicle or a failed thermostat, without going through two distinct warm-up procedures as per the methodology associated with the graph of FIG. 3. However, those skilled in the art would appreciate that the methodologies of FIGS. 4 and 3 might be combined such that a diagnosis as per the method of FIG. 4 could be confirmed in a subsequent cooled engine start-up procedure as per methodology associated with FIG. 3.

Figure 6:
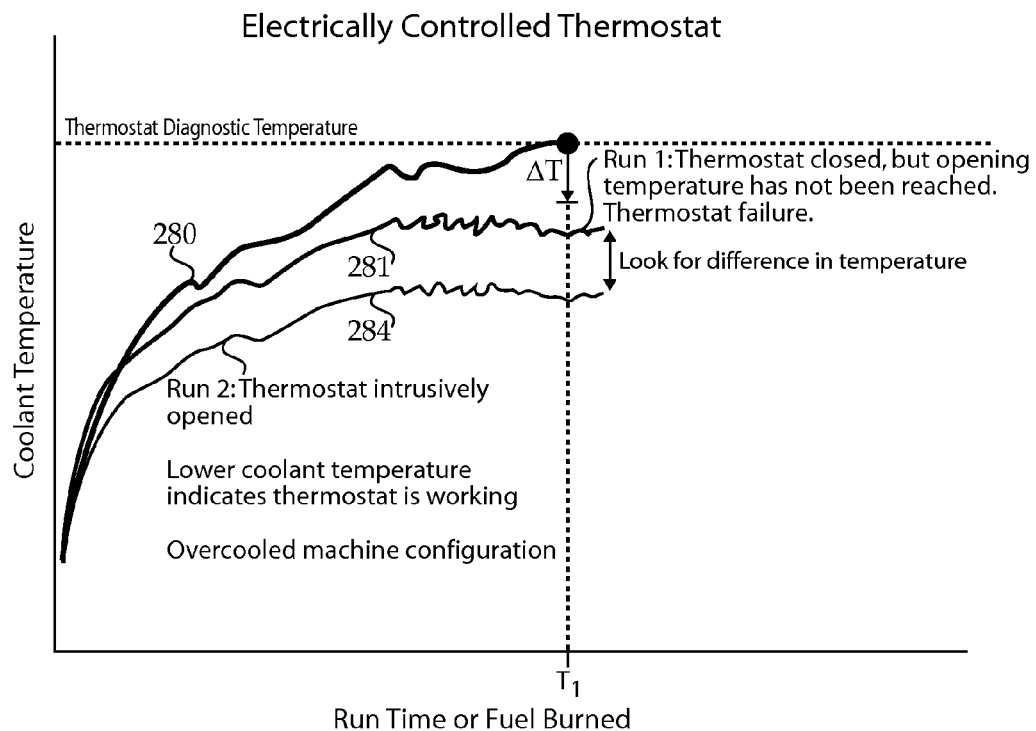
FIG. 6 is a graph of coolant temperature versus run time or fuel burned for an alternative strategy that utilizes an electronically controlled thermostat.

Referring back to FIG. 1, in the event that thermostat 18 is electronically controlled by engine controller 15 via a communication line 118, an on-board diagnostic strategy that intrusively opens or closes thermostat 18 as an alternative to intrusively turning on or off fan 38 can be exploited to accurately diagnose a cooling fault and correctly distinguish a failed thermostat from an overcooled vehicle configuration error. FIG. 6 shows one specific example where two successive start-up procedures (similar to FIG. 3) where measured temperature is compared to a predicted temperature curve 280. In this example, at time $T_1$ the predicted temperature curve 280 predicts that the coolant temperature should be within a temperature ΔT of the thermostat diagnostic temperature (TDT). If not, as indicated in first run start up curve 281, there is an indication of a cooling fault. However, at that time, there is insufficient information to determine whether the coolant fault may be attributable to the thermostat failure or an overcooled vehicle configuration error. Thus, in a second subsequent engine start run, shown as curve 284, a thermostat is intrusively commanded to open at engine start. Recalling, that the thermostat diagnostic temperature is set to be substantially lower than the proper thermostat opening temperature. Curve 284 indicates that because the coolant temperature is substantially less than the first run cooling temperature curve 281, this indicates that the thermostat 18 is working properly, but the machine 10 has an overcooled configuration error. Those skilled in the art will appreciate that if the second run cooling curve 284 looked like the first run cooling curve 281, that would be indicative of a thermostat failure because the intrusive command to open the thermostat had no real effect on the cooling curve, indicating that the thermostat was apparently stuck open in the first place.

Figure 7:
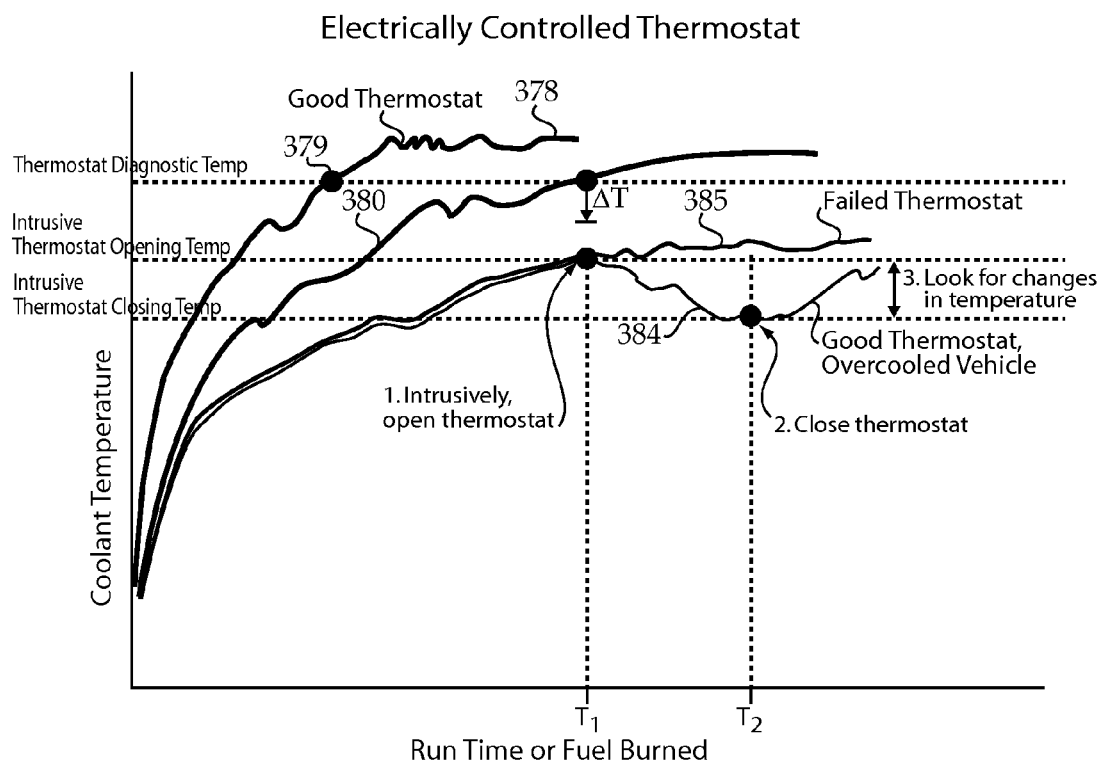
FIG. 7 is a graph of coolant temperature versus run time or fuel burned for an alternative electronically controlled thermostat strategy relative to that illustrated in FIG. 6.

Referring now to FIG. 7, an alternative single run strategy using the electronically controlled thermostat is shown as an alternative to the dual start-up procedure illustrated in association with FIG. 6. In this case, and as discussed earlier, at time $T_1$, the coolant temperature should be within a variance ΔT of the thermostat diagnostic temperature (TDT). If the measured coolant temperature is substantially less than the (TDT) in a magnitude greater than ΔT this is an indication of a cooling fault. Thus, if a fault condition is detected, the electronic engine controller 15 will command the thermostat to intrusively open at $T_1$. Recalling that the thermostat should be closed at time $T_1$ since the coolant temperature should not have risen to the level above the thermostat opening temperature that would cause the thermostat to open. The predicted temperature warm-up curve is indicated by the curve 380. Curve 384 indicates that when the thermostat is intrusively opened at time $T_1$ and the coolant temperature is again measured at a later time $T_2$, that there is a vehicle configuration error indicating an overcooled vehicle. This is expected because if the temperature drops on an absolute level and/or drops relative to a predicted temperature between time $T_1$ and time $T_2$ and drops substantially, that must indicate that the thermostat was properly closed before being commanded to open at time $T_1$, and that the intrusive opening of the thermostat caused the coolant temperature to drop due to the initiation of fluid flow in radiator loop 41. On the otherhand, curve 385 shows an example curve between time $T_1$ and $T_2$ where the thermostat has failed. In other words, if the curve between times $T_1$ and $T_2$ shows little subsequent additional change in coolant temperature on an absolute level and/or compared with a predicted coolant temperature, that must indicate that the thermostat was already stuck open when commanded to open at time $T_1$. In such a circumstance, one could expect the coolant temperature to not drastically change between times $T_1$ and $T_2$. This graph also includes an example good thermostat warm-up curve 378 that shows if the measured temperature at the time associated with point 379 has reached the thermostat diagnostic temperature, than the on-board diagnostic algorithm can be skipped since there is an earlier indication that no cooling fault exists. Those skilled in the art will appreciate that the strategies associated with FIGS. 6 and 7 might be most appropriate in those cases where the machine 10 includes an electronically controlled thermostat 18, but the air circulating fan 38 is not directly controlled by the engine controller 15.

Figure 8:
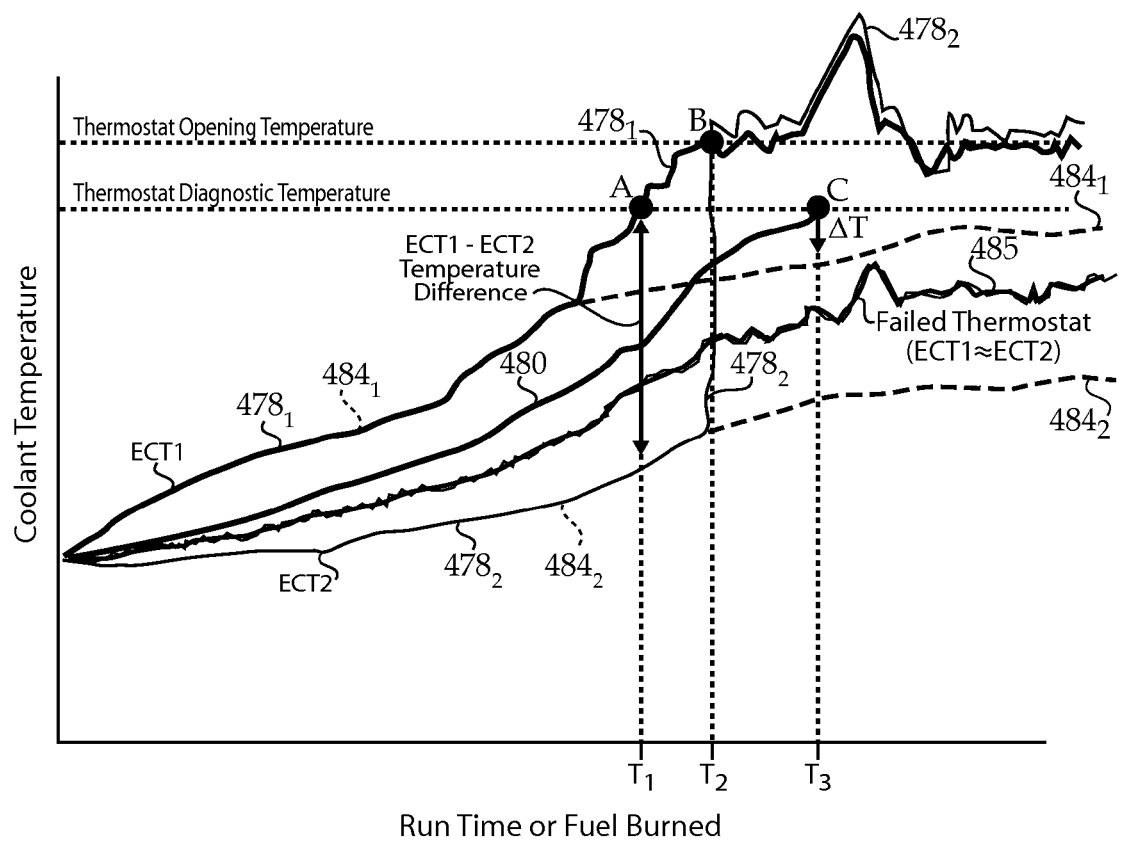
FIG. 8 is a graph of coolant temperature versus run time or fuel burned for a diagnostic strategy using dual coolant temperature sensors.

Referring again back to FIG. 1, as an alternative to either the single temperature sensor strategies associated with FIGS. 3 and 4, or the electronically controlled thermostat strategies associated with FIGS. 6 and 7, the present disclosure contemplates still another strategy in which a second temperature sensor 120 is located to sense coolant temperature in radiator loop 41, and communicate that temperature information to engine controller 15 via a communication line 121. FIG. 8 is a graph showing various scenarios with different curves indicating the expected and actual measured temperatures at temperature sensor 20 and temperature sensor 120 respectively. Curve 480 shows the predicted coolant temperature curve at the location of temperature sensor 20 and shows that at time $T_3$ the coolant temperature should have reached the thermostat diagnostic temperature (TDT). As stated earlier, the TDT is substantially below the thermostat opening temperature (TOT). Curves $478_1$ and $478_2$ show the measured temperatures at sensors 20 and 120, respectively for one example of a proper warm-up cycle in which the vehicle is neither overcooled nor is there any indication of a failed thermostat. In particular, at time $T_1$, the first temperature sensor 20 indicates that the coolant has reached the thermostat diagnostic temperature. At this time, one would expect the second temperature sensor as indicated in curve $478_2$ to be substantially lower since the thermostat 18 should not yet be open. This is indeed confirmed in the graph of FIG. 8 as the second temperature sensor curve $478_2$ shows a substantially lower temperature at time $T_1$ relative to temperature sensor 20 indicated by curve $478_1$. At a later time $T_2$, the first temperature sensor 20 indicates that the coolant has reached the thermostat opening temperature (TOT). As expected the second temperature sensor 120 shows the coolant temperature in radiator loop 41 jumping rapidly to be nearly equivalent with that of first temperature sensor 20 at point B. This is indicative that the thermostat was previously closed and properly opened when the coolant temperature reached the thermostat opening temperature. Thereafter, as expected, curve $478_1$ and $478_2$ should closely track one another indicating little difference in temperature on either side of the properly opened thermostat 18.

Curve 485 shows the condition when both temperature sensors 20 and 120 indicate the same coolant temperature throughout the start-up procedure, and the coolant temperature stays below the thermostat diagnostic temperature (TDT). Those skilled in the art will appreciate that this indicates a failed thermostat since the thermostat 18 must be stuck open in order for the coolant temperature on both sides of the thermostat 18 to be reading nearly the same temperature throughout the engine start. Thus, curve 485 would be diagnosed as a failed thermostat. Alternatively, curves $484_1$ and $484_2$ show example curves that would be indicative of a cooling failure for an overcooled vehicle that includes a properly working thermostat. At time $T_3$ the predicted curve indicates that the coolant temperature reading from sensor 20 should be within ΔT of the thermostat diagnostic temperature. If not, curve $484_1$ indicates a cooling system failure. However, because second temperature sensor 120 continues to indicate a substantially lower temperature than temperature sensor 20, this indicates that the thermostat 18 remains properly closed and is hence working properly at time $T_3$. Thus, the onboard diagnostic logic will assess this situation as indicating a vehicle error attributable to an overcooled system configuration.

Referring again back to FIG. 1, other coolers, such as for instance the air to air aftercooler 54 may have their effectiveness changed by whether fan 38 is operating. Thus, a failure in any cooler that exchanges heat with ambient air and the ambient air flow is affected by operation of fan 38 can also be diagnosed with regard to a possible failure. Thus, during normal operation when fan 38 is off, one could expect a temperature sensor reading from temperature sensor 58 that is communicated to engine controller 15 via communication line 59 to indicate a temperature drop if fan 38 is intrusively turned on when it would otherwise be off. If the temperature reading at temperature sensor 58 shows little difference with fan 38 intrusively turned on, that might be indicative of some sort of heat exchanger failure, such as debris, fouling, or the like plugging the entry hole for ambient air to the air to air aftercooler 54 resulting in operation of fan 38 having little to no effect in the circulation of cooling air through the air to air aftercooler 54. On the otherhand, if the temperature seen at sensor 58 drops by the intrusive activation of fan 38 or other method of forced convection of air, for example through vehicle motion, that would be an indication that the cooler 54 was working properly. If a fault is detected, that might be indicated to the operator via some suitable indication such as a visible warning light, and may be logged by the engine controller 15 for later servicing diagnostics, and the like. Thus, the principles of the disclosure can be applicable to more than simply diagnosing and distinguishing between a failed thermostat and an overcooled vehicle configuration, and actually can apply to any cooler that utilizes ambient air for heat exchange that is affected by operation or non-operation of the circulation fan 38.

INDUSTRIAL APPLICABILITY

The present disclosure finds potential application in any machine that includes an engine system made up of an engine and a cooling system or coolers or heat exchangers. The present disclosure finds particular application in those instances when the same engine system may be installed in different machines with different heat and cooling loads placed on the cooling system. The present disclosure is further applicable to any such system in which an excess heat/cooling load is placed on the engine cooling system, resulting in an overcooled engine that might give rise to a mistaken indication of a faulty thermostat when the problem actually lies with the vehicle configuration. The present disclosure also finds particular application in machines in which an engine system includes an onboard cooling system diagnostic feature that might be installed in machines with various cooling loads but retain the ability to distinguish a vehicle configuration error from a thermostat failure. The present disclosure also finds potential application in an onboard diagnostic strategy for determining heat exchange error in any heat exchanger, such as air to air aftercoolers, EGR coolers, air to air pre-coolers, oil to air oil coolers and the like that ought to be effected in their heat exchange ability by operation and non-operation of a circulating fan 38. The present disclosure may also find application in an onboard diagnostic strategy for determining failures with a fuel system.

Figure 2:
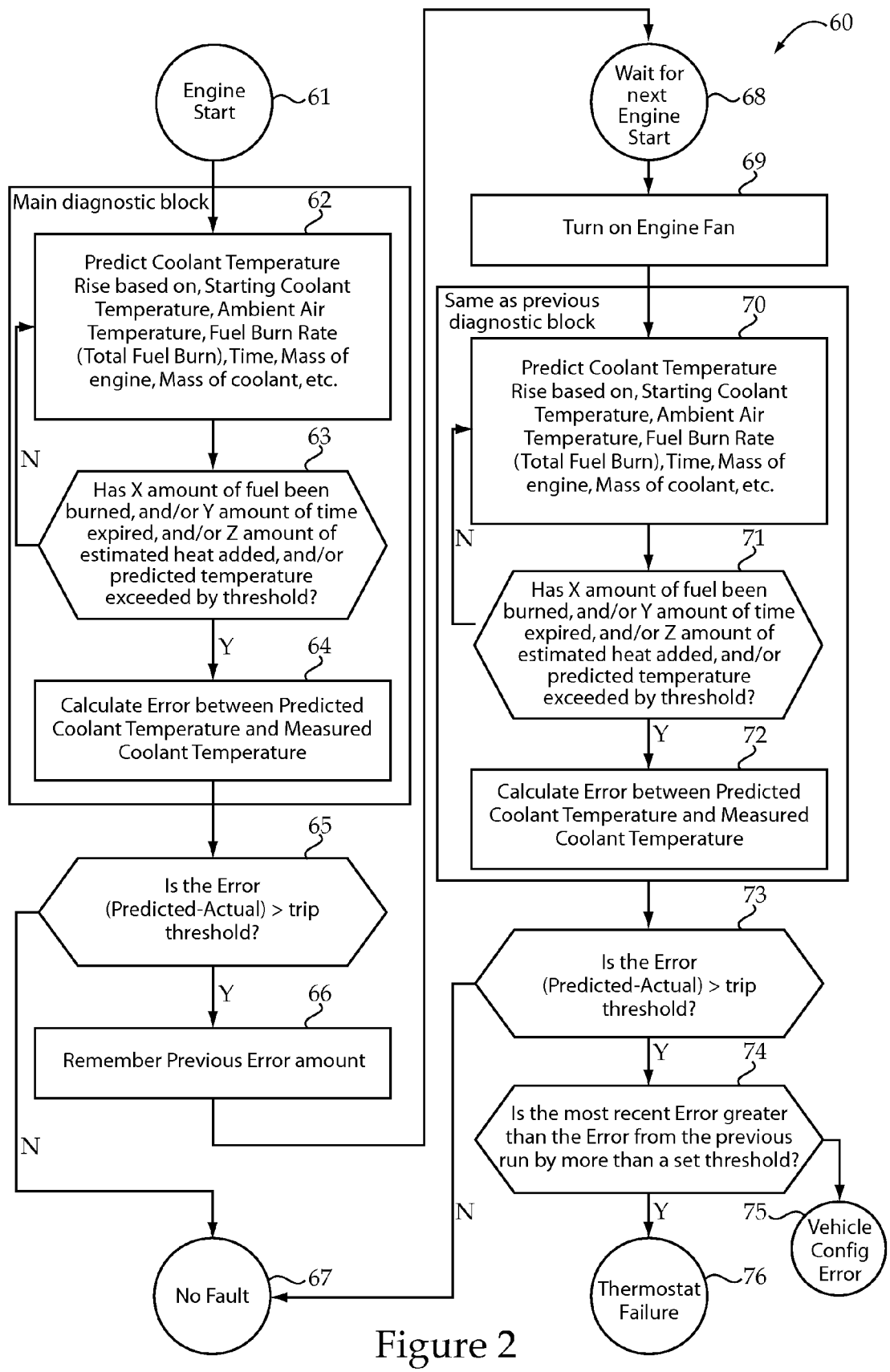
FIG. 2 is a cooling system diagnostic logic flow diagram according to another aspect of the present disclosure.

Referring now to FIG. 2, an example cooling system diagnostic logic flow diagram is illustrated. The logic is reflected by a diagnostic algorithm 60 that would typically be programmed to be executed by electronic engine controller 15 using known programming techniques. The logic flow begins with an engine start at 61. Next, at block 62, a predicted coolant temperature rise is estimated based upon such variables as starting temperature, the ambient air temperature, a fuel burn rate (as total fuel burned), time elapsed, engine mass, coolant mass, and other potential influences, and may also consider the desired level of sophistication and accuracy of the predicted temperature rise rate. Once the predicted coolant temperature rise has been determined, the logic advances to a fuel/time query 63 that evaluates whether a predetermined amount of fuel X has been burned since the initiation of the engine start and/or whether a predetermined period of time Y has elapsed and/or whether a predetermined amount of estimated heat Z has been added to the engine 14 and/or the predicted coolant temperature has exceeded TDT by a threshold since initiating start-up. This aspect of the disclosure allows the evaluation to occur at a single point in time or a single instant after a predetermined amount of fuel has been burned after the initiation of an engine start procedure, rather than actually generating a continuous temperature curve. In other words, this strategy allows the comparison of a single temperature rather than a comparison of two curves, which would also fall within the intended scope of the present disclosure. If an insufficient amount of time has elapsed and/or an insufficient amount of fuel has been burned and/or an insufficient amount of estimated heat Z has been added to the engine 14 and/or the predicted coolant temperature has not exceeded TDT by a threshold, the logic returns to the previous block 62 where the predicted temperature is again determined. On the other hand, if a sufficient amount of time has elapsed and/or sufficient amount of fuel has been burned and/or an insufficient amount of estimated heat Z has been added to the engine 14 and/or the predicted coolant temperature has not exceeded TDT by a threshold, the logic advances to error calculation block 64. At this point, the electronic engine controller 15 calculates an error between the predicted coolant temperature and the actual measured coolant temperature as indicated by temperature sensor 20. The logic next advances to error magnitude query 65. At this point, the algorithm 60 evaluates whether the difference between the predicted and actual temperatures is greater than some predetermined threshold. That predetermined threshold may be calibrated to prevent generation of false positives. Thus, if the error is substantial, the logic advances to block 66 and records the magnitude of the temperature error. If the difference between the actual and predicted temperatures is less than the threshold, the logic advances to no fault condition 67. No further action is yet taken until a subsequent engine start where the logic begins again.

In a subsequent engine start, if the previous engine cold start revealed a no fault condition, the logic would return to cold start block 61 in the logic diagram. On the other hand, if a previous temperature error was logged, the logic advances to initiation block 68. When this occurs, the electronic engine controller 15 will note that a previous error has been recorded and turns on the engine fan 38. This action is performed at engine fan block 69. Next, the logic proceeds to coolant temperature prediction block 70 where the temperature again is predicted based upon the starting coolant temperature, the ambient air temperature and likely the same considerations as block 62, but also might take into consideration the temperature influence with the fan 38 on. Next, the logic advances to time/fuel query 71. Like before, the logic evaluates whether an amount of fuel X has been burned and/or whether an amount of time Y has elapsed and/or an insufficient amount of estimated heat Z has been added to the engine 14 and/or the predicted coolant temperature has not exceeded TDT by a threshold. If not, the logic may return to coolant temperature prediction block 70 where the predicted temperature is again determined. If sufficient time has elapsed and/or a sufficient amount of fuel has been burned and/or an insufficient amount of estimated heat Z has been added to the engine 14 and/or the predicted coolant temperature has not exceeded TDT by a threshold, the logic advances to error calculation block 72. At this point, the electronic engine controller 15 calculates an error between the predicted coolant temperature and the measured coolant temperature. The logic of the present disclosure may not necessarily need to be performed after a specific amount of fuel has been burned and/or a specific amount of time has elapsed since the initiation of the engine start. However, those skilled in the art will appreciate that those familiar with their own engine systems 12 will know at what point during the engine start procedure that a substantial deviation in temperature is likely to occur. For instance, it is unlikely to be able to reliably predict a cooling system problem immediately after the engine has been started, nor is it likely to be easily diagnosed after an engine could have achieved its warmed-up operational temperature. Also, the issue of correctly diagnosing a problem can be performed but is more problematic on an engine that has already achieved an equilibrium temperature either due to warm start or after prolonged operation.

If the error calculation performed at block 72 reveals an error that is greater than some calibrated threshold, which may or may not be the same as the threshold used at query 65, the logic advances to an error comparison query 74. The calibrated threshold may be stored before engine operation or calculated during engine operation, or otherwise. At this point, electronic engine controller 15 evaluates whether the most recent or second pass error is greater in magnitude than the previously recorded error stored at block 66. Query 74 compares the magnitude difference between the two errors to another calibrated threshold. If the error in the second pass test with the engine fan on is substantially different than the first pass error, this will be logged as a thermostat failure at block 76. On the other hand, if the second pass temperature error calculated at block 72 is similar to the first pass temperature error calculated at block 64 and stored at block 66, this is indicated as a vehicle configuration error 75. In other words, the machine is set up with too much heat exchange load placed on the engine such that the engine is overcooled and may not have the ability to attain a proper operating temperature in its current configuration. Whichever fault condition is revealed by the onboard diagnostic cooling system logic, that failure may be logged as a cooling system fault of either the thermostat type or the vehicle configuration error type, and that information may be communicated to the operator in the form of a dashboard warning light, or other message. For instance, the engine operator may be alerted to seek service attention for the engine and/or cooling system as soon as possible.

Figure 5:
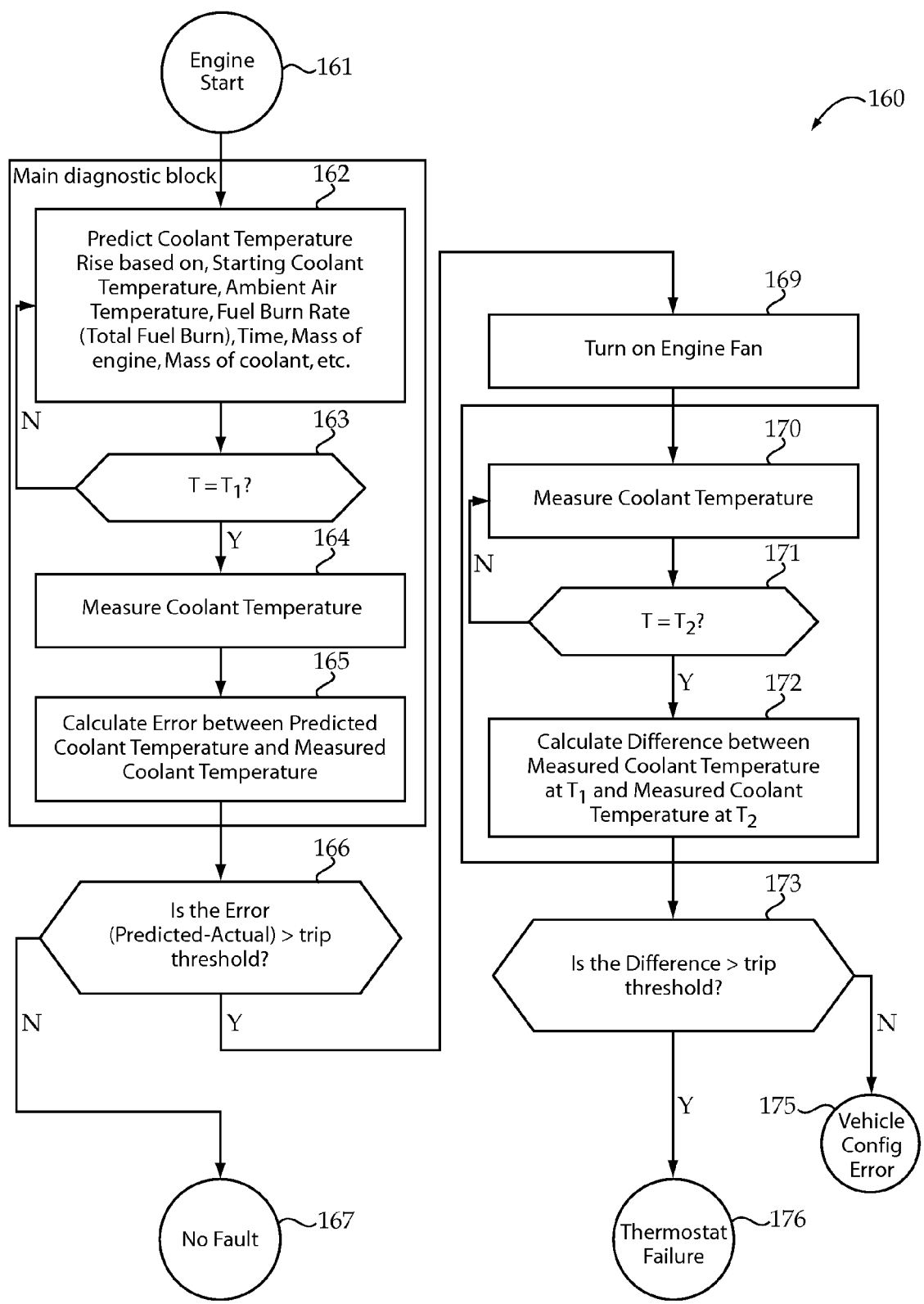
FIG. 5 is a logic flow diagram for carrying out the diagnostic strategy illustrated in FIG. 4.

Referring now to FIG. 5, a coolant system diagnostic logic of algorithm 160 is shown as an alternative to the algorithm 60 previously discussed with regard to FIGS. 2 and 3. Algorithm 160 is associated with FIG. 4 and represents an alternative single warm-up run strategy relative to the first and second warm-up pass strategy associated with FIGS. 2 and 3. However, the strategy shares in common with the strategy of FIGS. 2 and 3 in that the machine 10 includes a single temperature sensor 20. At 161 the engine is started. At block 162, the coolant temperature is predicted much in the same manner as discussed earlier with regard to block 62 in the previous algorithm. Next, a time elapsed, fuel burned or estimated heat added query evaluates whether the thermostat diagnostic temperature (TDT) should have been reached. If not, the algorithm circles back to repredict the coolant temperature. If the time equals $T_1$, then the coolant temperature is measured at sensor 20 and communicated to engine controller 15. Next, a calculation is made between the difference between the coolant temperature measured and the thermostat diagnostic temperature. If that difference is greater than the expected variance ΔT, then the engine fan is intrusively turned on at block 169. On the otherhand, if the measured temperature is within ΔT of the thermostat diagnostic temperature, this is indicated at 167 as a no fault condition. After the fan 38 is turned on at block 169, the logic advances to block 170 where the coolant temperature is again measured. Next, a time elapsed fuel burned or estimated heat added query is evaluated to determine if time equals $T_2$. If an insufficient time has elapsed an insufficient amount of fuel burned, or an insufficient estimated amount of heat was added, the logic loops back and remeasure the coolant temperature at block 170. If time equals $T_2$ the logic will advance to block 172 where the difference between the temperature at time $T_1$ and the temperature at time $T_2$ is determined or calculated. Next, the difference between the coolant temperature from time $T_1$ to time $T_2$ is evaluated at query 173. If the difference is greater than some calibrated threshold, such as in curve 185 that the temperature has substantially dropped after the fan 38 has turned on, this is indicative of a thermostat failure 176. On the otherhand, if the temperature at time $T_2$ is close in magnitude to the temperature of time $T_1$ this will be indicated at 175 as a vehicle configuration error. Those skilled in the art will appreciate that most or all of the methodologies previous described are most effective during engine start, and preferably engine cold start when various coolant temperatures start out relatively low as per the graphs of FIGS. 3, 4, 6 and 7. It is contemplated that at engine start, the execution of a cooling system diagnostic algorithm is initiated. In most of the previously described strategies a cooling system electrical actuator is intrusively actuated as part of the execution of the cooling system diagnostic algorithm when the cooling system controller would otherwise have the cooling system electrical actuator deactuated. For instance, in the case of an electrically actuated thermostat, the cooling system would normally keep the actuator used to open the thermostat in a deactuated position when coolant temperatures are below a thermostat opening temperature. Thus, in another aspect, the cooling system electrical actuator may be switched or electrical motor that drives the engine fan. In either case, the diagnostic algorithm intrusively overrides the regular cooling system controller to intrusively actuate the relevant cooling system electrical actuator and preferably while coolant temperatures are substantially below a thermostat opening temperature. Once temperatures get above the thermostat opening temperature, correctly distinguishing between a cooling system configuration error and a thermostat fault can become problematic and may risk adverse heat stress on the engine. While the cooling system diagnostic algorithm is executing, cooling temperatures are recorded at least one location at a plurality of times. In some instances, these plurality of times may take place in two successive engine starts, and other ones of the described strategies, these plurality of times may all occur during a single engine start. In either case, certain ones of the recorded coolant temperatures before the cooling system electrical actuator is actuated are compared to coolant temperatures after the electrical actuator is actuated. Thus, most of the previously described diagnostic strategies include an insight that intrusively actuating a cooling system electrical actuator should have a noticeable affect on coolant temperature that is predictable and allows for both diagnosing a faults and distinguishing between an overcooled cooling system configuration error versus a thermostat fault indicating a stucco thermostat. Depending upon which cooling system electrical actuator is being used in the diagnostic strategy and determining threshold temperature variations that could be expected based upon a wide variety of ambient conditions and other known considerations, the coolant temperatures before and after the electrical actuator is actuated must satisfy the described conditions before a fault would be logged.

The present disclosure has the advantage in certain applications where additional heat or cooling loads are placed upon the engine after the engine system diagnostic logic has been developed. In other words, the cooling system failure diagnostic logic of the present disclosure finds the advantage of being operable even in the face of uncertain heat/cooling loads placed upon the cooling system. The present disclosure also has the advantage of accomplishing the task of identifying engine cooling system fault conditions utilizing a single temperature sensor, which may be literally half the cost of two temperature sensors and accompanying logic. Finally, the present disclosure finds application in those instances where a vehicle overcooling configuration error has the potential to be accidentally identified as a thermostat failure, possibly resulting in repeated servicing occurrences that mistakenly replace a properly working thermostat. In addition, the present disclosure can find specific advantageous application in those instances where an engine system manufacturer produces an engine system that is later implemented into a machine in an unknown manner with uncertain heat/cooling loads to be placed on the engine cooling system.

The present disclosure also may be useful in diagnosing problems with other heat exchangers that utilize ambient air as one of the heat exchange fluids. For instance, if the fan 38 is intrusively turned on when it should otherwise be off, one could expect the effectiveness of air to air aftercooler 54 (FIG. 1) to be more effective and be indicated by a temperature drop. If the temperature exiting the air to air aftercooler 54 remains somewhat steady after intrusively turning fan 38 on, this might be indicative of a heat exchanger failure, such as due to debris blocking the flow of air through the relevant heat exchanger. This information likewise could be communicated to the operator and/or logged by the engine controller 15 for diagnostic and repair purposes.

It should be understood that the above description is intended for illustrative purposes only, and is not intended to limit the scope of the present disclosure in any way. Thus, those skilled in the art will appreciate that other aspects of the disclosure can be obtained from a study of the drawings and the disclosure.

The invention claimed is:

1. An engine cooling system diagnostic method, comprising the steps of:
   initiating execution of a cooling system diagnostic algorithm;
   recording a coolant temperature for at least one location at a plurality of times as part of execution of the cooling system diagnostic algorithm;
   actuating a cooling system electrical actuator intrusively as part of execution of the cooling system diagnostic algorithm when a cooling system controller has the cooling system electrical actuator deactuated;
   comparing a first coolant temperature before the actuating step with a second coolant temperature after the actuating step as part of execution of the cooling system diagnostic algorithm; and
   logging a cooling system fault if a comparison from the comparing step satisfies a condition as part of execution of the cooling system diagnostic algorithm.

2. The method of claim 1 wherein the recording step includes recording an air coolant temperature; and
   the actuating step includes turning on a cooling fan.

3. The method of claim 1 wherein the logging step is preceded by a step of confirming a cooling system fault, which was determined from a first engine start, during a second engine start.

4. The method of claim 1 wherein the initiating step is performed responsive to an engine start; and
   the recording step includes recording an engine coolant fluid temperature.

5. The method of claim 4 wherein the first coolant temperature is recorded after a first engine start;
   the second coolant temperature is recorded after a second engine start;
   the logging step includes logging a cooling system configuration fault if the comparing step satisfies a first condition, but logging a thermostat fault if the comparing step satisfies a second condition.

6. The method of claim 5 wherein the actuating step includes turning on a cooling fan.

7. The method of claim 5 wherein the actuating step includes actuating a thermostat opening actuator.

8. The method of claim 4 wherein the actuating step is performed when the coolant temperature is below a thermostat opening temperature; and
   the logging step includes logging a cooling system configuration fault if the comparing step satisfies a first condition, but logging a thermostat fault if the comparing step satisfies a second condition.

9. The method of claim 8 wherein the actuating step includes turning on a cooling fan.

10. The method of claim 8 wherein the actuating step includes actuating a thermostat opening actuator.

11. An engine system comprising:
    an electronically controlled engine that includes an electronic controller;
    a cooling system fluidly connected to the electronically controlled engine, and including a thermostat, and a temperature sensor positioned for sensing a coolant fluid temperature fluidly positioned between the thermostat and the electronically controlled engine;
    the temperature sensor being in communication with the electronic controller; and
    the electronic controller being configured to execute a cooling system diagnostic algorithm operable to log one of a cooling configuration fault and a thermostat fault.

12. The engine system of claim 11 wherein the cooling system diagnostic algorithm is operable to actuate a cooling system electrical actuator intrusively as part of execution of the cooling system diagnostic algorithm when a cooling system control algorithm has the cooling system electrical actuator deactuated.

13. The engine system of claim 12 wherein the cooling system includes a coolant outbound port and a coolant return port for fluid connection to a heat exchanger outside of the engine system.

14. The engine system of claim 12 wherein the thermostat includes the cooling system electrical actuator in control communication with the electronic controller.

15. The engine system of claim 12 wherein the cooling system includes an engine fan with the cooling system electrical actuator in control communication with the electronic controller.

16. A machine comprising:
    a machine body;
    an engine system attached to the machine body and including an electronically controlled engine that includes an electronic controller; a cooling system fluidly connected to the electronically controlled engine, and including a thermostat, and a temperature sensor positioned for sensing a coolant fluid temperature fluidly positioned between the thermostat and the electronically controlled engine; and the temperature sensor being in communication with the electronic controller; and, the electronic controller being configured to execute a cooling system diagnostic algorithm operable to log one of a machine cooling configuration fault and a thermostat fault; and at least one machine heat exchanger attached to the machine body and fluidly connected to the cooling system.

17. The machine of claim 16 wherein the cooling system diagnostic algorithm is operable to actuate a cooling system electrical actuator intrusively as part of execution of the cooling system diagnostic algorithm when a cooling system control algorithm has the cooling system electrical actuator deactuated.

18. The engine system of claim 17 wherein the thermostat includes the cooling system electrical actuator in control communication with the electronic controller.

19. The engine system of claim 17 wherein the cooling system includes an engine fan with the cooling system electrical actuator in control communication with the electronic controller.

20. The engine system of claim 17 wherein the cooling system includes a coolant outbound port and a coolant return port for fluid connection to a heat exchanger outside of the engine system.

* * * * *